May 27, 1941.   K. F. ADLER   2,243,305
POT HOLDER
Filed Aug. 30, 1939
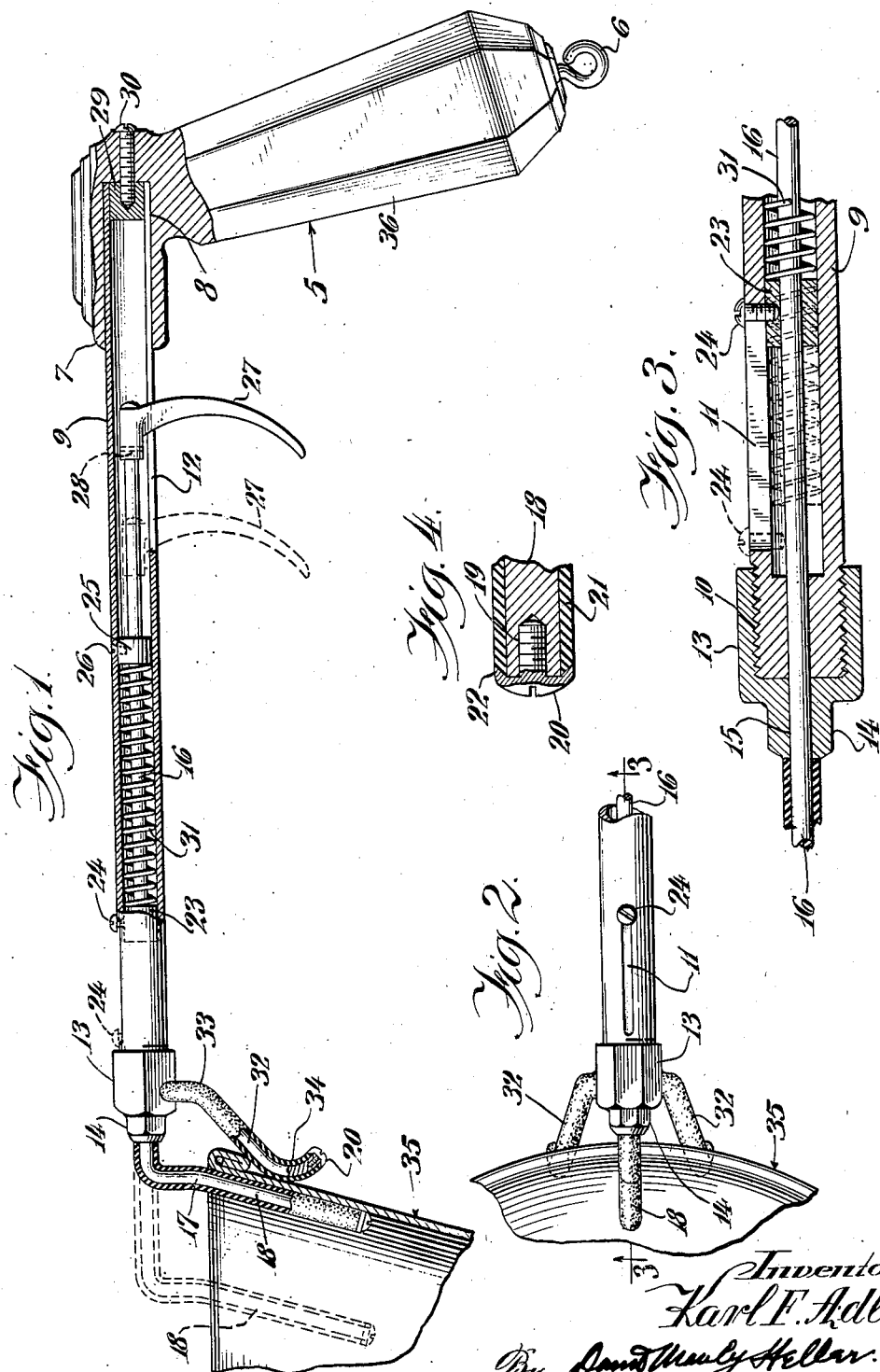
Inventor
Karl F. Adler
By David Manly Heller
Attorney Patented May 27, 1941

2,243,305

UNITED STATES PATENT OFFICE 2,243,305

POT HOLDER

Karl F. Adler, Chicago, Ill.

Application August 30, 1939, Serial No. 292,577

2 Claims. (Cl. 294—34)

This invention relates to devices for holding culinary utensils such as pots, pans, and other similar kitchen utensils, especially when they are in a heated condition and can not be handled by the bare hand.

The primary object of the invention is the provision of such a device which is adapted to grip firmly and hold substantially pots, pans, and other kitchen utensils when they are hot, for example when removing them from stove, oven fire, etc.

Another object of the invention is the provision of a clamping jaw operating against knee members disposed in V formation to effect substantial gripping action.

Another object of the invention is the provision of a novel screw for securing effectively the edges of rubber hose used to cover the clamping members.

Another object of the invention is the provision of a device of the character to be described, which is useful and efficient in operation, durable in construction, practical, simple and convenient to operate, and an article which may be manufactured economically in quantity production.

Other features and objects of the invention will become apparent by reference to the accompanying drawing and the ensuing description wherein like parts are designated by like symbols and in which:

Fig. 1 represents a front view of my invention with certain portions in cross-section in order to better describe the operating elements comprising the same.

Fig. 2 is a fragmentary top view looking at Figure 1 showing the clamping members in gripping engagement with the rim of a culinary utensil.

Fig. 3 is an enlarged fragmentary cross-sectional view showing the spring actuated element comprising my invention.

Fig. 4 is an enlarged view showing the means of retaining the edges of flexible tubing material covering the gripping members of my invention.

By further reference to the drawing, especially to Figure 1, I designate my invention, generally, by the numeral 5, which comprises a handle member designated by the numeral 36, made of wood or any other insulating type of material, and to which is attached at the lower portion a screw eye designated by the numeral 6, providing a convenient arrangement for hanging the device in a kitchen where it will be ready for use and within easy reach when needed.

The handle member 36 is provided with an extension designated by the numeral 7 in which a hole is bored designated by the numeral 8. The tubing member 9 is firmly located in the handle member by virtue of a plug element designated by the numeral 29 which is driven into the tube 9, and a screw member designated by the numeral 30 which locks the tubing and holds it firmly in place.

The tubing is of suitable length in order to provide a safe insulated distance between the handle member 36 and the utensil generally designated by 35 which may be hot, the tubing being of such length as to off-set any heat radiation, which may come from the utensil, thus keeping the heat from contacting the hands gripping the device when it is being used.

The tubing 9 is threaded at its opposite end in order to receive the threaded portion 10 of the nipple member generally designated by the numeral 13, which comprises a large hexagonal section in order to facilitate the use of a wrench when assembling the nipple 13 with the tubing 9, and a smaller hexagonal extension designated by the numeral 14.

The purpose of this nipple 13 is twofold, one is to act as a bearing guide, having a bearing portion designated by the numeral 15 (Figure 3) to afford proper guiding for the rod designated by the numeral 16, and for the further purpose of supporting the two knees designated by the numeral 32, which are bent at the point 33, and the point 34 in order to provide an equalized clamping action for any object brought in contact with the arcuate portion 34 and the clamping extension designated by the numeral 18, which usually fits within the inner portion of a utensil, whereas the knees 32 fit on the outside, and thus by gripping the utensil between the V shaped knee members 32, and the clamping section 18, firm gripping action is the result.

The section 18 is made by bending the member 16 at right angles as indicated, and a further slight bend indicated by the numeral 17.

The rubber designated by the numeral 21 which is tubular in shape or section, is fitted over the clamping portions 18 and the clamping knees 32, and retained in place by the screw members designated by the numeral 20, which, as can be seen, are provided with a recessed portion designated by the numeral 22 in order to prevent the edges of the resilient tubing from becoming frayed. The ends of the gripping clamp 18 and 32 are threaded as indicated by the numeral 19 to receive the screws 20.

The operative elements, or mechanism, provided to enable the clamping portion 18 and the knees 32 to co-act or to cooperate in gripping engagement, is as follows: The member 16 is secured at its opposite end to the trigger member 27 by virtue of a pin designated by the numeral 28. The trigger 27 may be assembled to the rod member 16 by compressing the spring to the fullest extent, and thus bringing the right end portion of the member 16 within the range of the slot 12, thus allowing the pin 28 to be driven in assembly with the members 16 and 27.

When the pin 28 is driven in, the spring 31 may be permitted to assume its normal position, whence the trigger member 27 assumes the dotted position indicated at Figure 1, and the clamping jaw 18 assumes the dotted position indicated in Figure 1.

In Figure 3, the spring 31 is shown under compression, the dotted position indicating its normal expanded form.

The guide rod 16 has a bearing designated 15 which is located within the member 13, and is also provided with another bearing on the opposite side designated by the numeral 25 which is secured within the tubing member 9 by virtue of the screw 26, and is held securely in place.

A slotted portion 11 is provided in order that the spring retaining plug designated by the numeral 23, locked in place by the screw 24, which at the same time acts as a set screw against the rod 16, may afford adjustment to the tension of the spring 31, at such time when the spring has lost some of its life. By increasing its compression, it will have a tendency to maintain the portion 18 in the dotted position shown in Figure 1.

In use my device is operated as follows; the handle 36 is grasped in the palm of the hand with the forefinger or index finger in extended position grasping the trigger member 27, then by a pulling action on the part of the forefinger, the trigger will cause the spring 31 to be compressed and the portion 18 to advance toward the arcuate portion 34 of the clamping knees 32. The knees 32, looking at Figure 2, radiate outwardly and angularly so as to conform to a V shape.

Before compression of the spring, and before the trigger is operated, the clamping portion 18 and 34 while in their normal open position, should be placed so as to straddle the periphery of the utensil. When the trigger 27 is operated it causes the spring 31 to be depressed, thus causing the portion 18 to secure the rim portion of a cooking utensil in between itself and the arcuate sections 34, hence clamping and holding it firmly in place.

The grip is sufficient to permit the utensil to be moved about and placed on any convenient table or other support for inspection and examination.

In order to release the device from gripping engagement with a pot or utensil, all it is necessary to do is to release the grip of the forefinger and upon the trigger member 27, thus disengaging the device from holding the utensil.

If it is desired to place the utensil back into the oven or over a fire, the same operation is repeated, namely grabbing it in such a manner as to cause the forefinger to compress the spring by virtue of the trigger 27, thus grasping the rim of the utensil, which is too hot to handle otherwise, holding it and moving it about to the desired position in an oven.

It can be seen, that I provide an invention which is ideally useful in kitchens, and is conveniently adapted for the purposes heretofore described, may be handled readily, and I feel that I have described it in such succinct terms that those familiar with the art will have no difficulty in grasping the features and advantages claimed for it.

Altho I have depicted a preferred embodiment of my invention in the illustration and the description, I realize that it is susceptible of many alterations, modifications, and improvements, hence I reserve the right to all such alterations, modifications and improvements which come within the scope and spirit of my invention, and the purview of the foregoing description; my invention being limited only by the subjoined claims.

Having thus described my invention what I claim as new and desire to secure by Letters Patent is:

1. A device of the character described, having handle means provided with utensil holder means, comprising stationary knee holding means disposed in V formation co-acting with slidably operated clamping means mounted in said handle means, spring means mounted within said handle means, normally urging the said slidably operated clamping means to open position with respect to the said knee holding means, spring adjusting means, comprising a slotted portion in said handle means, a plug member slidably mounted within said handle means and adjustably secured to said slidably operated clamping means, and trigger means securely attached to one end of said slidably operated clamping means, the said slidably operated clamping means and the said knee holding means covered with resilient tubing adapted to increase their frictional grip upon the rim of a utensil.

2. A device of the character described, having handle means provided with utensil holder means, comprising stationary knee holding means disposed in V formation co-acting with slidably operated clamping means mounted in said handle means, spring means mounted within said handle means, normally urging the said slidably operated clamping means to open position with respect to the said knee holding means, spring adjusting means, comprising a slotted portion in said handle means, a plug member slidably mounted within said handle means and adjustably secured to said slidably operated clamping means, trigger means securely attached to one end of said slidably operated clamping means, the said slidably operated clamping means and the said knee holding means covered with resilient tubing adapted to increase their frictional grip upon the rim of a utensil, and screw means provided with annular recesses V shaped in section securing the edges of said resilient tubing to prevent the said edges from fraying.

KARL F. ADLER.